No. 735,612. PATENTED AUG. 4, 1903.
L. STEINBERGER.
SINGLE LINK STRAIN.
APPLICATION FILED JAN. 29, 1903.
NO MODEL.
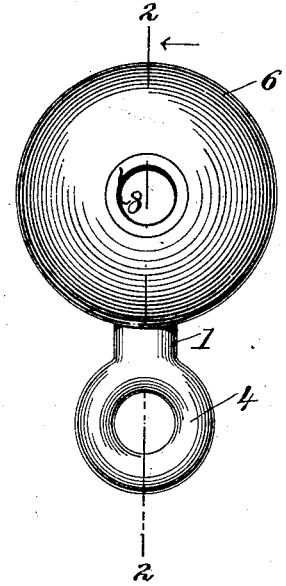
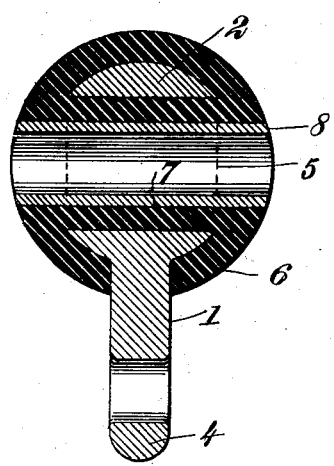
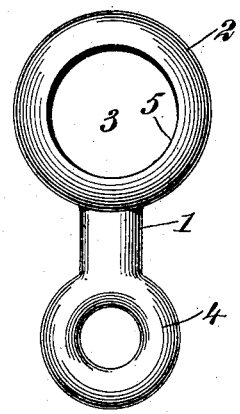
WITNESSES:
William P. Goebel.
Walton Harrison.
INVENTOR
Louis Steinberger
BY
Munn
ATTORNEYS.
THE NORRIS PETERS CO., PHOTO-LITHO., WASHINGTON, D. C.

No. 735,612. Patented August 4, 1903.

UNITED STATES PATENT OFFICE.

LOUIS STEINBERGER, OF NEW YORK, N. Y.

SINGLE-LINK STRAIN.

SPECIFICATION forming part of Letters Patent No. 735,612, dated August 4, 1903.

Application filed January 29, 1903. Serial No. 141,022. (No model.)

*To all whom it may concern:*

Be it known that I, LOUIS STEINBERGER, a citizen of the United States, and a resident of the city of New York, borough of Brooklyn, in the county of Kings and State of New York, have invented a new and Improved Single-Link Strain, of which the following is a full, clear, and exact description.

My invention relates to insulated electrical strains used for outdoor wiring, and more particularly to the production of a strain embodying a high degree of simplicity, neatness, cheapness, and general efficiency.

My invention further relates to the production of a strain in which there is virtually but a single "metallic link," as the term is usually employed.

Reference is to be had to the accompanying drawings, forming a part of this specification, in which similar characters of reference indicate corresponding parts in all the figures.

Figure 1 is a plan view of my improved strain complete. Fig. 2 is a section upon the line 2 2 of Fig. 1 looking in the direction of the arrow, and Fig. 3 is a plan view of the metallic link alone.

The metallic link 1 is of longitudinal form and is provided at one of its ends with a substantially spherical member 2, integral therewith, and with a cylindrical opening 3, passing entirely through the spherical member, whereby the same is virtually formed into an eye capable of use as a bearing-eye. The other end of the link is provided with a suspension-eye 4 for engaging the wire, cable, or other conductor, from which the strain is suspended.

The internal surface 5 of the bearing-eye 2 is cylindrical, as indicated in Figs. 2 and 3. An insulating medium is disposed upon the link in such manner as to partially envelop the same, the spherical bearing-eye 2 being completely covered both internally and externally, as indicated in Fig. 2. The insulation forms a cylindrical lining 7 within and concentric to the bearing-eye 2.

A tubular bushing 8, of metal, is disposed within the aperture 3 and concentric to the eye 2, being spaced therefrom by the internal portion 7 of the insulation 6. The purpose of this bushing 8 is not to serve as a link proper in the usual acceptation of the term, but is rather a means for protecting the insulation 7 within the bearing-eye 2.

I do not limit myself to the use of the cylindrical bushing 8 for the purpose of protecting the inner portion 7 of the insulation, for obviously many other mechanical expedients may be employed for this purpose.

The cylindrical opening of the insulation 7, protected, preferably, by the metallic bushing 8, constitutes one eye of my strain, the other eye being the metallic eye 4, which is integral with the link 1.

I do not limit myself to the particular form of link herein shown and described, as other forms of single links may be employed without departing from the spirit of my invention.

Having thus described my invention, I claim as new and desire to secure by Letters Patent—

1. A single-link strain, comprising a single metallic link provided with a suspension member and with a bearing-surface, an insulating medium engaging said bearing-surface and partially enveloping said metallic link, and means for preventing injury to said insulating medium adjacent to said bearing-surface.

2. A single-link strain, comprising a single metallic link provided with a suspension member and with a bearing-surface, an insulating medium engaging said bearing-surface and partially enveloping said metallic link, and a metallic bushing for preventing injury to said insulating medium engaging said bearing-surface.

3. A single-link strain, comprising a single metallic link provided with a bearing-eye, and with a suspension member, an insulating medium engaging said bearing-eye and partially enveloping said metallic link, and a metallic bushing disposed within said eye and concentric thereto, said bushing engaging said insulating medium and serving as a suspension member.

4. A single-link strain, comprising a single metallic link provided with a head integral therewith, and with an eye through said head, an insulating medium engaging said eye, and a metallic bushing concentric with said eye and engaging said insulating medium.

5. A single-link strain, comprising a single metallic link provided with an enlarged head and with a cylindrical eye passing directly through said head, an insulating medium engaging said eye internally, and a metallic bushing having the form of a cylindrical sleeve disposed within said eye and concentric thereto, said bushing engaging said insulation and providing a cylindrical opening entirely through said head and said insulating medium.

6. A single-link strain, comprising a single metallic link provided with a suspension-eye and with a bearing-eye, an insulating medium engaging said bearing-eye and provided with a cylindrical opening, and a cylindrical metallic member engaging said opening and free to serve as a suspension member.

7. A single-link strain, comprising a single metallic link provided with a suspension-eye and with a bearing-eye, an insulating medium partially enveloping said metallic link and partially filling said bearing-eye, and a metallic bushing disposed within said bearing-eye and spaced therefrom by said insulating medium.

8. A single-link strain, comprising a single metallic link provided with a suspension-eye and with a bearing-eye, an insulating medium partially filling said bearing-eye and engaging the same concentrically, and means for preventing injury to said insulating medium within said bearing-eye.

9. A single-link strain, comprising a single metallic link having a head provided with a cylindrical eye, an insulating medium engaging said cylindrical eye internally and fitting the same concentrically, and means for protecting the internal surface of said insulating medium within said eye.

10. A single-link strain, comprising a single metallic link having a head provided with a suspension-eye and with a bearing-eye, an insulating medium disposed partially within said bearing-eye and engaging the same internally, said insulating medium enveloping said head but not said suspension-eye, and means for preventing injury to said insulating member within said bearing-eye.

11. A single-link strain, comprising a metallic link having at one of its ends a bearing-eye and at the other of its ends a head provided with a cylindrical eye, an insulating medium enveloping said head and forming an internal lining to said bearing-eye, and means for preventing injury to said internal lining for said cylindrical eye.

12. A single-link strain, comprising a metallic link, having at one of its ends a suspension-eye, and at the other of its ends with a head provided with a cylindrical eye, an insulating medium enveloping said head and forming an internal lining for said cylindrical eye, and a metallic bushing disposed within said lining and concentric thereto, said bushing passing entirely through said cylindrical eye and through said insulating medium.

13. A single-link strain, comprising a single metallic link provided with a bearing-eye, an insulating medium partially filling said eye and partly enveloping said metallic link, said insulating medium being substantially in the form of a sphere, and a cylindrical bushing disposed within said eye and passing entirely through said sphere.

14. A single-link strain, comprising a single metallic link, an insulating medium engaging said link, means for suspending said link, and means for preventing injury to a portion of said insulating medium.

15. A single-link strain, comprising a single link, an insulating medium engaging the same, mechanism for suspending said link, and a member engaging a portion of said insulating medium for the purpose of strengthening the same.

16. A single-link strain, comprising a single link provided at each end with mechanism for suspending the same, an insulating medium engaging said link, and a metallic member for strengthening said insulating medium.

17. A single-link strain, comprising a metallic link, an insulating medium engaging said link and partially enveloping the same, and a metallic sleeve connected with said insulating medium for the purpose of strengthening the same.

18. A single-link strain, comprising a single metallic link, an insulating medium engaging said link, and means for suspending said link.

19. In a single-link strain, the combination of a single metallic link, and an insulating medium partially enveloping the same.

20. In a single-link strain, the combination of a single metallic link provided with two eyes, and an insulating medium engaging said link and enveloping one of said eyes.

In testimony whereof I have signed my name to this specification in the presence of two subscribing witnesses.

LOUIS STEINBERGER.

Witnesses:
WALTON HARRISON,
JNO. M. RITTER.